United States Patent
Kawazu et al.

[15] 3,652,098
[45] Mar. 28, 1972

[54] SEALING DEVICE FOR RECIPROCATING PUMP

[72] Inventors: Yoshio Kawazu; Tadashi Egami, both of Chikushino-machi, Japan

[73] Assignee: Mitsubishi Jukogyo Kabushiki Kaisha, Tokyo, Japan

[22] Filed: Apr. 17, 1970

[21] Appl. No.: 29,440

[30] Foreign Application Priority Data

Apr. 30, 1969 Japan.................................44/33391

[52] U.S. Cl.................................................277/59, 277/105
[51] Int. Cl. ................................................F16j 15/18
[58] Field of Search.......................277/59, 105, 106, 102, 58

[56] References Cited

UNITED STATES PATENTS 843,230  2/1907  McCarthy...............................277/106

3,348,849  10/1967  Newcomb et al......................277/105
2,951,721  9/1960  Asp....................................277/DIG. 6

FOREIGN PATENTS OR APPLICATIONS 372,490  3/1923  Germany...............................277/105
25,966  11/1910  Great Britain.........................277/105

*Primary Examiner*—Robert I. Smith
*Attorney*—McGlew and Toren

[57] ABSTRACT

In a reciprocating pump, a stuffing box is providing through which a rod reciprocates. Adapter means and packing means are arranged in the stuffing box to effect a reduction in the pressure of the fluid flowing from the pump into the stuffing box. The packing means are arranged to form open spaces about the rod within which spaces pressure reduction takes place. Additional packing means are provided about the rod outwardly from the open spaces for providing the final sealing effect.

8 Claims, 4 Drawing Figures

INVENTOR
YOSHIO KAWAZU
TADASHI EGAMI
BY McGlew & Toren
ATTORNEY 3,652,098

SEALING DEVICE FOR RECIPROCATING PUMP

SUMMARY OF THE INVENTION

The present invention is directed to a sealing device for sealing the sliding rod in a reciprocating pump handling fluids of low viscosity and low lubricating value, such as water, and, more particularly, it concerns the arrangement of packing means within a stuffing box about the sliding rod for effecting a reduction in pressure and sealing effect about the rod.

In a reciprocating pressure pump handling fluids of low viscosity and low lubricating value, such as water or water incorporated with an additive, it is not sufficient to use metal packing means in a device for sealing the sliding member which extends outwardly from the pump cylinder. As a result, packing means made of material other than metal have been used in the sealing device, such as cloth packing impregnated with synthetic rubber, leather packing and similar non-metallic materials.

In an arrangement known in the past, self-seal ring-type packing has been used in a stuffing box about the sliding member or reciprocating rod. However, it has been found that such packing members cause considerable friction with the rod resulting in the development of heat. Further, the fluid from the pump does not pass through the packing sufficiently to provide a lubricating effect for the packing located more remotely from the pump cylinder. As a result, there has been a tendency for such packing to wear rapidly and to require adjustment in the seating pressure of the packing.

It is a primary object of the present invention to provide a novel seal construction about the reciprocating member extending from a pump which handles fluids of low viscosity and low lubricating value. The seal construction affords a high degree of pressure withstanding capability and wear resistance and it is not necessary to adjust the seating pressure of the packing used in the seal construction after it is positioned about the reciprocating member. As a result, the pump can operate at high speeds, high pressure and with a short stroke which features have been considered impossible in the past.

Another object of the present invention is to provide a reciprocating pump which is markedly compact in size, has a longer service life, and is considerably easier to operate as compared to similar pumps known in the prior art.

Therefore, in accordance with the present invention, a stuffing box is provided about the periphery of a reciprocating rod, at the point at which it extends outwardly from the pump cylinder. Packing means are positioned within the stuffing box protected by adapter means so that the packing means located closer to the pump cylinder operate to reduce the pressure of the fluid flowing from the cylinder while the remaining packing means located further from the cylinder are mainly employed for exerting a sealing effect.

In a specific embodiment of the invention, a stuffing box is positioned at the end of a pump cylinder from which a reciprocating rod extends. A sealing device is positioned about the rod within the stuffing box and is made up of at least one adapter member arranged to seat and protect a plurality of axially spaced packing members which are disposed about the rod within the stuffing box. The adapter member or members are made of a sufficiently rigid construction to withstand the pressure of the fluid contained in the pump cylinder. The packing members cooperate with the adapter means to form annular open spaces about the rod within which the pressure of the fluid is reduced as it passes outwardly along the rod from the pump cylinder. Further, a packing member is located at the outer end of the stuffing box and its main purpose is to provide a sealing effect as compared to the pressure reducing effect afforded by the packing members located inwardly from it.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DESCRIPTION OF THE PRIOR ART ARRANGEMENT

Figure 1:
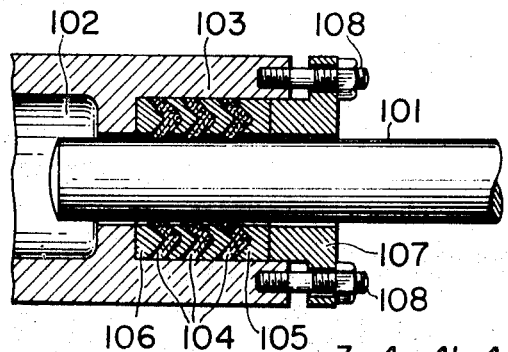
FIG. 1 is a partial cross sectional view of a portion of an axially extending reciprocating pump embodying a sealing device which has been used in the prior art.

In FIG. 1, a reciprocating rod 101 is shown extending outwardly from a cylinder 102 of a reciprocating pump. A stuffing box 103 extends axially from the end of the walls forming the cylinder 102 and contains a sealing device for the rod 101. The sealing device comprises a plurality of axially spaced self-seal ring-type packing members 104 and the packing members have a V-shaped cross sectional configuration. At the outer end of the stuffing box, a female adapter 105 is in contact with the surface of the outermost packing member 104 and a male adapter 106 is located between the end of the cylinder 102 and the innermost packing member 104. At the outer end of the stuffing box, a packing gland 107 clamps the sealing device in position by means of clamping bolts 108 which are secured into the walls of the stuffing box. The packing gland 107 and clamping bolts 108 provide a proper pressure for holding the sealing device in place.

In this known seal construction, the fluid load within the cylinder which is applied to the first or innermost packing member 104 located adjacent the cylinder is successively transmitted to the other packing members located further from the cylinder. As a result, all of the packing members 104 operate under the full fluid pressure which is developed within the pump cylinder. Therefore, the inner surfaces of all of the packing members are strongly pressed against the surface of the rod 101 causing considerable friction and resulting in heat being generated in these parts. Furthermore, the lubricating fluid, such as water, from the pump cannot be spread in a sufficient manner over all of the packing members particularly those which are spaced furthest from the cylinder. Due to these conditions, the packing members tend to wear very quickly. This tendency toward wear is intensified if there is an increase in the speed of the reciprocating action of the rod 101.

Because of the above-mentioned disadvantages of the prior art, the maximum rotating speed of conventional pumps of this type has been limited to 500 r.p.m. Consequently, a large reduction gear is required between the pump and the means driving the pump, for example a motor. When it had been desired to obtain a large discharge capacity from pumps of this type, the stroke length of the rod had to be increased because of the low rotational speeds. Therefore, it has been inevitable that such prior art pumps were made unduly large in size.

Furthermore, in the sealing device as shown in FIG. 1, the placement of the packing members 104 is complicated and it is difficult to adjust the seating pressure on these members after they have been in position. In addition, It is necessary to adjust the seating pressure of such packing members periodically due to the wear they experience after the pump has operated for a period of time.

DETAILED DESCRIPTION OF THE INVENTION

Figure 2:
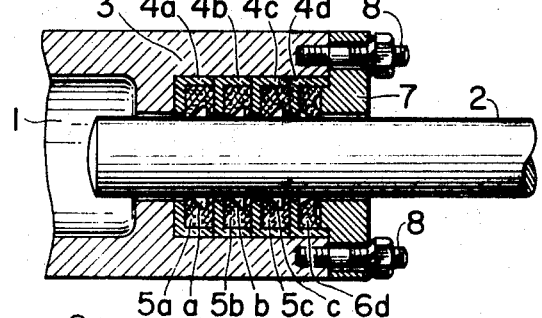
FIG. 2 is a view, similar to FIG. 1, of a sealing device for a reciprocating pump in accordance with the present invention.

In FIG. 2, a pump cylinder 1 is shown containing a rod 2 which extends through the end wall of the cylinder and is reciprocated by means of a motor or similar device, not shown. Walls extends outwardly from the end of the cylinder and form a stuffing box 3 which provides a cylindrically shaped open space about the outer periphery of the rod at the location where the rod extends outwardly from the cylinder.

Within the stuffing box 3, a quartet of cup-shaped adapter rings are provided in a serial arrangement about the rod 2. The adapter rings separate the space within the stuffing box into a plurality of individual chambers located one following the other in the axial direction of the rod. In FIG. 1 the chambers are designated as $a$, $b$, $c$, and $d$. The adapter rings 4a–4d are formed of a sufficiently rigid construction so that they are capable of withstanding the fluid pressure developed in the cylinder 1. The first three of the chamber $a$, $b$, and $c$ extending from the end of the cylinder 1 contain packing ring members 5a, 5b, and 5c, respectively which fit within and extend for the axial length of the chambers. The inner peripheral surfaces of the packing ring members are shaped to reduce their contact surface with the rod as compared to the axial length or thickness of the members. The reduction in surface contact occurs by providing a groove which extends about the inner periphery of the packing ring members and forms in cooperation with the juxtaposed surface of the rod the three ring-shaped open spaces for effecting a reduction in the pressure of the fluid flowing outwardly through the sealing device from the pump cylinder. These packing ring members are made of high-wear-resistant packing material such as Teflon, nylon and the like.

The outermost chamber $d$, that is, the chamber spaced the furthest from the pump cylinder, contains a packing ring member 6d of a different configuration which is arranged to a final sealing effect about the rod 2.

The end of the stuffing box adjacent the chamber $d$ is closed by a keeper plate 7 which is secured in place by a number of bolts 8. The fluid pressure developed within the pump cylinder is exerted on the packing members 5a, 5b, 5c, and 6d and is transmitted through the adapters 4a, 4b, 4c and 4d until it is finally impressed against the keeper plate 7.

In the sealing device shown in FIG. 1, a part of the high pressure fluid, which for the purposes of this description will be considered to be water, produced in the cylinder 1 flows into the first chamber $a$ as the red 2 reciprocates in the direction of the stuffing box. The water passes through the clearance between the rod 2 and the adapter 4a and then comes in contact with the packing ring member 5a located within the chamber $a$. Due to the configuration of the packing member, the high pressure water crates a turbulent effect in the chamber $a$ and, as a result, a pressure reduction occurs in the water. The water which has been subjected to a pressure reduction in chamber $a$ passes successively into the chambers $b$ and $c$ as it flows outwardly from the pump cylinder and is subjected to further pressure reduction in these chambers.

As the water flows along the rod through the adapter members, it lubricates the contacting surface of the packing ring members 5a, 5b, and 5c and the rod 2, and due to this lubricating effect, abnormal wear on these contacting surfaces is eliminated. The pressure of the water which eventually reaches the chamber $d$ located at the outer end of the stuffing box is reduced to almost zero because of the three-stage pressure reducing action effected by the spaces within the packing ring members 5a, 5b, 5c. A relatively small amount of the water reaching the chamber $d$ leaks through a very narrow clearance between the rod and the packing 6d due to the makeup of the packing and passes exteriorly of the stuffing box with the result that it lubricates the packing. Since the amount of water which leaks from the stuffing box is very small, it has very little influence on the efficiency of the pump.

In the embodiment described above, each of the packing ring members 5a, 5b, 5c and 6d are individually protected by the adapter rings 4a, 4b, 4c, and 4d which have a high degree of rigidity in position to the pressure of the fluid within the pump. The fluid load is applied consecutively to each of the packing ring members and eventually is transmitted to the keeper plate 7 through the respective adapter rings. Due to the arrangement of the sealing device, the fluid load exerted on the packing 5a located adjacent the pump cylinder is not transmitted directly to the packings 5b, 5c, and 6d as occurred in the prior art pumps. Accordingly, the packing ring members with the exception of the one located adjacent the pump cylinder are exposed to comparatively low pressure fluid since the pressure has been reduced by the packing member or members located closer to the pump cylinder. Therefore, excessive pressure fitting of each packing member to the rod surface due to high fluid pressure is prevented and, as a result, the wear on the packing members can be minimized.

Moreover, to prevent any excessive pressure contact between the packing members and the rod surface, a very small quantity of the water within the pump cylinder is permitted to leak between the surfaces of the packing members and the rod. The amount of water permitted to leak forms a lubricating water film between the juxtaposed surfaces of the packing members and the rod, and, as a result, a lubrication and cooling of these surfaces is satisfactorily provided and such conditions as abnormal heating and the like can be completely eliminated.

By utilizing this sealing device in a pump handling fluids of low viscosity and low lubricating value, the pump can be operated at high pressure, high speed and with a short stroke. In particular, the rotational speed of the pump can be increased to about twice that of similar pumps used in the prior art. Further, this arrangement permits the elimination of a reduction gear between the pump and its driving motor which was indispensable in the prior art pumps of this type, and thereby permits direct connection of the pump to a motor. As a result, the overall size of the pump is notably reduced and its manufacturing cost is also considerably reduced.

Another important feature of the sealing device disclosed herein is the easy manner in which it can be assembled and disassembled as compared with the packing means in conventional pumps of this type. Once the packing members have been assembled, it is not necessary to adjust their seating pressure. It can be readily appreciated that this arrangement provides a very valuable improvement for pumps.

As mentioned previously, the packing ring members 5a, 5b and 5c are shaped to provide a pressure reduction by providing a turbulent action in the fluid flowing between the packing members and the rod, and the packing member 6d is of such a configuration that it provides a final seal for the stuffing box. It permits the requisite leakage needed for the proper operation of the sealing device. Instead of the above-described packing members, it is possible to use V-shaped self-seal packing or roll packing which are commonly used in conventional pumps of this type. If a lantern ring (lubricating oil adapter) is inserted immediately ahead of the packing member 6d in order to accomplish forced lubrication, the lubricating effect can be enhanced. The selection of the packing is determined in accordance with the rotational speed of the pump, fluid pressure and other conditions.

Figure 3:
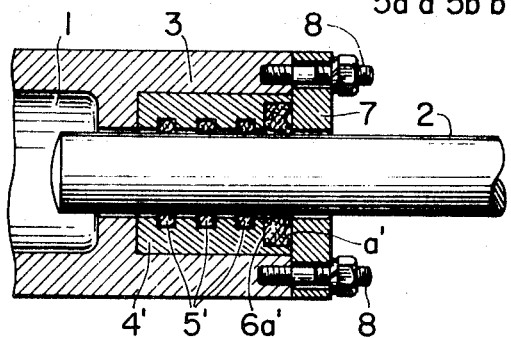
FIG. 3 and 4 are cross sectional views similar to FIG. 2 of two further embodiments of the present invention.
Figure 4:
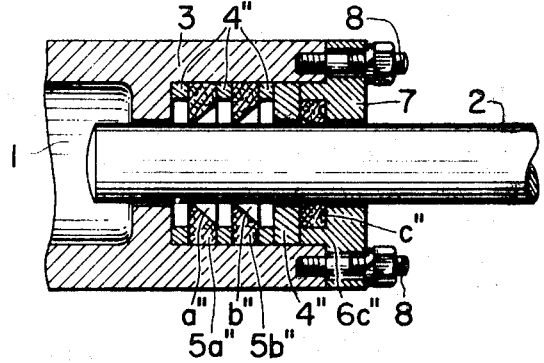

Further embodiments of the invention are shown in FIGS. 3 and 4 and the same reference numerals used in these figures as used in FIG. 2 indicate that the same members are employed in these further embodiments.

In FIG. 3, the adapter 4' is a sleeve-like member extending for the length of the stuffing box and having a plurality of grooves formed in its inner surface opposite the surface of the rod 2. An O-ring 5' is inserted in each of the grooves within the adapter 4' for producing a pressure reducing effect in the same manner as described with regard to the embodiment in FIG. 2. Further, a final packing member 6a' is located at the outer end of the adapter 4' and is arranged to afford a very small amount of leakage from the stuffing box. The only difference in this embodiment is that individual adapter rings are not used and packing rings of other shapes can be used in place of the O-rings.

Further, in this embodiment, it is possible to increase the labyrinth effect and lubricating effect by providing the adapter 4—' with serrated cuts.

Within the stuffing box 3, in FIG. 4, a series of adapter rings 4'' are provided with packing members 5a'' and 5b'' disposed between adjacent adapter rings. The interior surfaces of the packing members have a frustoconical surface converging in the direction proceeding away from the pump cylinder 1 and provide open spaces for effecting a pressure reduction of the fluid passing between the packing means and the rod.

Accordingly, the fluid load of the high pressure water within the pump cylinder is considerably reduced as it is transmitted to the keeper plate 7 through the adapter rings 4″, since due to this arrangement the fluid pressure exerted on the adapter ring 4″ adjacent the pump cylinder is reduced as it traverses the rod and is considerably reduced by the time it reaches the final packing 6c″ located adjacent the keeper plate 7. Further, the lubricating effect afforded by leakage through the sealing device is the same as in the embodiment shown in FIG. 2.

The invention has been described in detail with respect to the preferred embodiments illustrated in the drawing. In brief, the present invention relates to a sealing device for use with a reciprocating pressure pump handling fluids of low viscosity and low lubricating value, such as water or water incorporated with an additive, and such pumps have a stuffing box forming a circular open space through which the reciprocating rod of the pump passes from the pump cylinder and packing means are provided supported separately by one or a number of adapters to provide a pressure reducing effect in the fluid flowing through the stuffing box. In this manner, it is possible to eliminate the direct application of the high pressure of the fluid within the pump cylinder on the packing member which provides the final sealing within the stuffing box. Further, the arrangement of the packing means affords a passage of the fluid from the pump between the juxtaposed surfaces of the rod and the packing means for providing a lubricating effect. By means of this sealing device, it is possible to utilize a pump handling fluids of low viscosity and low lubricating value which can be operated at high pressure, high speed and with a short operating stroke. Therefore, based on the sealing device of the present invention, it is possible to provide a small-sized and low cost reciprocating pump which can be directly connected to a motor.

Moreover, with the various embodiments disclosed above, it is possible to assemble or disassemble the packing means more easily as compared to conventional pumps. Further, since it is not necessary to adjust the seating pressure of the packing means, once it is assembled in the sealing device, assembly repair and handling of such pumps can be carried out in a simple and easy manner.

What is claimed is:

1. In a reciprocating pressure pump, for a low viscosity and low lubricating value fluid, having a pump cylinder, a rod reciprocable in the cylinder and extending outwardly through an opening in one end wall of the cylinder, a cylindrical wall extending outwardly from the end wall, forming a stuffing box and defining, with the rod, an annular space concentric with the rod, sealing means in the annular space embracing the rod, and a sealing means retainer plate secured to the axially outer end of the stuffing box: improved sealing means comprising, in combination, relatively rigid annular adapter means in said stuffing box between said cylinder end wall and said retainer plate, said adapter means engaging the inner surface of said cylindrical wall and having clearance with said rod; and plural annular packing members of resilient non-metallic material serially positioned in said stuffing box in embracing relation with said rod and held in axially spaced relation with each other by said adapter means; said adapter means and the inner peripheries of said packing members conjointly defining, with said rod, axially spaced, serially arranged annular open spaces in which fluid under pressure passing through said end wall around said rod circulates to reduce the fluid pressure, axially of said stuffing box, in a stepwise fashion; the packing member nearest said retainer plate exerting a sealing effect; said packing members providing a controlled limited leakage outwardly along said rod to provide a lubricating film of the fluid between said rod and said packing members.

2. A reciprocating pressure pump, as set forth in claim 1, wherein the inner periphery of said packing members adjoining the periphery of said rod is configured to reduce the contacting surface in the axial direction of said packing member and rod to an axial length less than the axial dimension of said packing members.

3. A reciprocating pressure pump, as set forth in claim 1, wherein said packing members are formed of a very high-wear-resistant synthetic resin material.

4. A reciprocating pressure pump, as set forth in claim 2, in which said adapter means comprises a plurality of cup-shaped adapter rings disposed serially within said stuffing box; a respective packing member located within each adapter ring; at least that packing member nearest said retainer plate having a part of its inner periphery in contact with said rod and another axially extending part of its inner periphery spaced outwardly from said rod, so that said rod and said other axially extending part of the inner periphery of said last-named packing member conjointly form one annular open space wherein the flow of fluid from said pump cylinder creates a turbulent effect causing a drop in the pressure of fluid flowing therethrough.

5. A reciprocating pressure pump, as set forth in claim 2, wherein said adapter means comprises an axially elongated sleeve-like adapter member having a plurality of axially spaced annular grooves in its interior surface; and a respective packing member located within each groove, said packing members combining, with the opposed surfaces of said rod, to effect a reduction in the pressure of the fluid flowing from said pump cylinder.

6. A reciprocating pressure pump, as set forth in claim 5, wherein said packing members within said grooves have an O-ring configuration.

7. A reciprocating pressure pump for a low viscosity, low lubricating value fluid, comprising walls forming a pump cylinder, an axially extending rod having one end positioned within said cylinder and extending exteriorly therefrom through said walls forming said chamber and arranged to effect a reciprocating action relative to said cylinder, a stuffing box extending axially about said rod from the location at which said rod extends outwardly from said cylinder and said stuffing box forming an annular-shaped open space about said rod, a sealing device positioned about said rod within the annular-shaped open space in said stuffing box, wherein the improvement comprises a plurality of axially spaced packing members disposed about and in surface contact with said rod within said stuffing box, adapter means positioned within said stuffing box in contact with the axially extending interior surface thereof, said adapter means arranged to support and position said packing means within said stuffing box, said adapter means being of a sufficiently rigid construction to withstand the pressure developed in the fluid within said pump cylinder, said adapter means and packing members cooperating to form at least one annular open space about said rod intermediate the axial ends of said stuffing box and with said rod defining the inner periphery of said open space so that the pressure of the fluid within said pump cylinder is reduced in its passage between said rod and said packing members through said annular open space along the axial length of said rod within said stuffing box, at least said packing member spaced furthest from said pump cylinder exerting a sealing effect and said packing members positioned about said rod arranged to leak limited amounts of the fluid contained within said pump cylinder for providing a lubricating fluid film between the juxtaposed surfaces of said rod and packing members; the inner periphery of said packing members adjoining the periphery of said rod being configured to reduce the contacting surface in the axial direction of said packing member and rod to an axial length less than the axial dimension of said packing members; said adapter means comprising a plurality of axially spaced first adapter ring having their outer peripheral surface in contact with the interior surface of said stuffing box and having their inner peripheral surface laterally spaced from said rod, at least one said packing member positioned between said first adapter rings and having its outer peripheral surface in contact with the inner surface of said stuffing box and having a frusto-conically shaped inner peripheral surface diverging outwardly from said pump cylinder, the portion of said frusto-conical surface located closer to said pump cylinder being in contact with said rod and the remainder of said frusto-conical surface spaced outwardly from said rod forming an annular open space for effecting the reduction of the pressure fluid flowing through said stuffing box from said pump cylinder.

8. A reciprocating pressure pump, as set forth in claim 7, including a second adapter ring in contact with said first adapter ring located furthest from said pump cylinder, a keeper plate secured to the transverse end of said stuffing box remote from said pump cylinder, a second packing member positioned between said second adapter ring and said keeper plate and arranged in contact engagement with said rod for providing a sealing effect while permitting a limited passage of fluid therebetween.

* * * * *